United States Patent
Decarreau et al.

(10) Patent No.: US 12,224,869 B2
(45) Date of Patent: Feb. 11, 2025

(54) DUPLICATION AND RLC OPERATION IN NEW RADIO ACCESS TECHNOLOGY

(71) Applicant: Nokia Technologies Oy, Espoo (FI)

(72) Inventors: Guillaume Decarreau, Munich (DE); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/214,556

(22) Filed: Mar. 26, 2021

(65) Prior Publication Data
US 2021/0218507 A1    Jul. 15, 2021

Related U.S. Application Data

(62) Division of application No. 16/493,407, filed as application No. PCT/FI2018/050160 on Mar. 6, 2018.

(60) Provisional application No. 62/470,402, filed on Mar. 13, 2017.

(51) Int. Cl.
| | |
|---|---|
| *H04L 1/1829* | (2023.01) |
| *H04L 5/00* | (2006.01) |
| *H04L 69/40* | (2022.01) |
| *H04W 28/04* | (2009.01) |

(Continued)

(52) U.S. Cl.
CPC ............ *H04L 1/1848* (2013.01); *H04L 5/001* (2013.01); *H04L 69/40* (2013.01); *H04W 28/04* (2013.01); *H04W 28/06* (2013.01); *H04W 80/08* (2013.01)

(58) Field of Classification Search
CPC ......... H04L 1/08; H04L 1/1848; H04L 5/001; H04L 69/40; H04W 28/04; H04W 28/06; H04W 80/02; H04W 80/08
See application file for complete search history.

(56) References Cited

U.S. PATENT DOCUMENTS

| | | |
|---|---|---|
| 8,605,674 B2 | 12/2013 | Park et al. |
| 2009/0097425 A1 | 4/2009 | Sammour et al. |

(Continued)

FOREIGN PATENT DOCUMENTS

| | | |
|---|---|---|
| CN | 102104892 A | 6/2011 |
| CN | 104753627 A | 7/2015 |

(Continued)

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 13)", 3GPP TS 36.323 V13.4.0, Dec. 2016, pp. 1-39.

(Continued)

*Primary Examiner* — Khoa Huynh
(74) *Attorney, Agent, or Firm* — ALSTON & BIRD LLP

(57) ABSTRACT

In accordance with example embodiments as described herein there is at least an apparatus and method to perform transmitting packet data convergence protocol data unit duplicates over two or more carriers; receiving an indication that indicates packet data convergence protocol data unit has been correctly transmitted via one of two or more carriers; and upon receiving the indication, instructing to discard other packet data convergence protocol duplicates over carriers other than the one of two or more carriers with a successful delivery.

15 Claims, 4 Drawing Sheets

550: transmitting, by a wireless node, packet data convergence protocol data unit duplicates over two or more carriers 560: receiving an indication that indicates a packet data convergence protocol data unit has been correctly transmitted via one of two or more carriers 570: upon receiving the indication, instructing to discard other packet data convergence protocol duplicates over carriers other than the one of two or more carriers with a successful delivery

(51) Int. Cl.
*H04W 28/06* (2009.01)
*H04W 80/08* (2009.01)

(56) References Cited

U.S. PATENT DOCUMENTS

| | | | |
|---|---|---|---|
| 2011/0119761 A1* | 5/2011 | Wang | H04L 63/1458 726/23 |
| 2012/0281564 A1 | 11/2012 | Zhang et al. | |
| 2015/0085646 A1* | 3/2015 | Vannithamby | H04W 24/10 370/228 |
| 2015/0131578 A1 | 5/2015 | Baek et al. | |
| 2016/0057585 A1* | 2/2016 | Horn | H04L 45/245 370/312 |
| 2016/0164793 A1* | 6/2016 | Basu Mallick | H04L 47/564 370/235 |
| 2016/0262066 A1 | 9/2016 | Ozturk et al. | |
| 2016/0302075 A1 | 10/2016 | Dudda et al. | |
| 2020/0007281 A1* | 1/2020 | Kilinc | H04W 36/00692 |

FOREIGN PATENT DOCUMENTS

| | | |
|---|---|---|
| EP | 2830352 A1 | 1/2015 |
| EP | 3565367 A1 | 11/2019 |
| EP | 3603322 A1 | 2/2020 |
| EP | 3637658 A1 | 4/2020 |
| WO | 2014/185953 A1 | 11/2014 |
| WO | 2018/170891 A1 | 9/2018 |

OTHER PUBLICATIONS

Partial Supplementary European Search Report received for corresponding European Patent Application No. 18767660.6, dated Apr. 1, 2021, 16 pages.
"L2 transport of SRBs and relation to RLF handling", 3GPP TSF-RAN WG2 #84, R2-134221, Agenda Item: 7.2.2.2, Ericsson, Nov. 11-15, 2013, 5 pages.
Non-Final Office action received for corresponding U.S. Appl. No. 16/493,407, dated May 13, 2021, 25 pages.
Extended European Search Report received for corresponding European Patent Application No. 18767660.6, dated Jul. 19, 2021, 19 pages.
"Redundancy below PDCP for NR", 3GPP TSG-RAN WG2 Meeting #97, R2-1701183, Agenda Item: 10.2.1.2, InterDigital Communications, Feb. 13-17, 2017, 4 pages.
"Handling of Duplicated PDCP POU in Split Bearer", 3GPP TSG-RAN2 Meeting #87bis, R2-144352, Agenda item: 7.1.3.1, LG Electronics Inc., Oct. 6-10, 2014, pp. 1-3.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.1.0, Dec. 2016, pp. 1-317.
"New SID Proposal: Study on New Radio Access Technology", 3GPP TSG RAN Meeting #71, RP-160671, Agenda Item: 9.1, NTT DOCOMO, Mar. 7-10, 2016, 8 pages.
"3rd Generation Partnership Project; Technical Specification Group Radio Access Network; Study on New Radio Access Technology; Radio Interface Protocol Aspects(Release 14)", 3GPP TR 38.804, V0.4.0, Nov. 2016, pp. 1-30.
"3rd Generation Partnership Project; Technical Specification Group Radio Access Network; Evolved Universal Terrestrial Radio Access (E-UTRA); Radio Link Control (RLC) protocol specification (Release 13)", 3GPP TS 36.322, 13.2.0, Jun. 2016, pp. 1-45.
"3rd Generation Partnership Project; Technical Specification Group Radio Access Network; Evolved Universal Terrestrial Radio Access (E-UTRA); Radio Resource Control (RRC); Protocol specification (Release 14)", 3GPP TA 36.331 V14.1.0, Dec. 2016, pp. 1-654.
International Search Report and Written Opinion received for corresponding Patent Cooperation Treaty Application No. PCT/FI2018/050160, dated Jun. 7, 2018, 17 pages.
"Further Aspects of Data Duplication in PDCP Layer", 3GPP Tsg-Ran WG2 #97, R2-1700834, Agenda Item: 10.2.1.2, Ericsson, Feb. 13-17, 2017, pp. 1-3.
"Considerations on Packet Duplication for URLLC", 3GPP TSG-RAN WG2 Meeting #9, R2-1701986, Agenda item: 10.2.1.2, Samsung, Feb. 13-17, 2017, 4 pages.
"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.1.0, Dec. 2016, pp. 1-39.
Tentative Rejection received for corresponding Taiwan Patent Application No. 107108312, dated Apr. 25, 2019, 9 pages of office action and 4 pages of translation available.
Office action received for corresponding Vietnam Patent Application No. 1-2019-05369, dated Dec. 23, 2019, 1 page of office action and 1 page of translation available.
Office action received for corresponding Korean Patent Application No. 2019-7029930, dated Sep. 18, 2020, 6 pages of office action and 3 pages of translation available.
Office action received for corresponding Taiwan Patent Application No. 107108312, dated Jan. 4, 2021, 9 pages of office action and 4 page of translation available.
Office action received for corresponding Korean Patent Application No. 2020-7033171, dated Jan. 21, 2021, 4 pages of office action and 3 pages of translation available.
Ericsson, "Data duplication and link selection for URLLC in NR", 3GPP TSG-RAN WG2 #AH, R2-1700428, (Jan. 17-19, 2017), 3 pages.
Extended European Search Report for European Application No. 24197661.2 dated Dec. 13, 2024, 14 pages.

* cited by examiner

DUPLICATION AND RLC OPERATION IN NEW RADIO ACCESS TECHNOLOGY

RELATED APPLICATIONS

This application is a Divisional Application of, and claims priority from, U.S. application Ser. No. 16/493,407 filed on Sep. 12, 2019, which was originally filed as PCT Application No. PCT/FI2018/050160, filed on Mar. 6, 2018, which claims priority from U.S. Provisional Application No. 62/470,402, filed on Mar. 13, 2017, which is hereby incorporated by reference in its entirety.

TECHNICAL FIELD

The teachings in accordance with the exemplary embodiments of this invention relate generally to a novel method to address Packet duplication at a PDCP sublayer and, more specifically, relate to improving radio link control and radio link failure operations when duplication at the PDCP sublayer takes place.

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  AM acknowledged mode
  ARQ automatic repeat request
  CPT control protocol data unit type
  HARQ hybrid automatic repeat request
  MAC medium access control
  MCG master cell group
  NR new radio
  OTA over-the-air
  P poll bit
  PDCP packet data convergence protocol
  PDU protocol data unit
  R reserved bit
  RLC radio link control
  RLF radio link failure
  RRC radio resource control
  SC segmentation control
  SDU service data unit
  SN sequence number
  TB transport block
  UM unacknowledged mode In LTE, the radio protocols for the user plane currently consists of three layers: Packet Data Convergence Protocol (PDCP), Radio Link Control (RLC) and Medium Access Control (MAC).

The main services or functions of the PDCP sublayer for example include: header compression and decompression, transfer of user data and ciphering & deciphering as well as timer-based SDU discard. When dual connectivity is configured, for a split bearer, PDCP also performs reordering in a continuous manner. These functions rely on a PDCP SN in the PDCP header of each PDCP PDU.

In addition, a study item on New Radio Access Technology (NR) has been agreed. One goal of NR is to support the very high bit rates required for 5G. In order to support such bit rates, it was agreed to move concatenation to MAC and reordering to PDCP, leaving to RLC the main functions of error correction and segmentation/re-assembly. Furthermore, to increase reliability as well as potentially decrease latency, packet duplication of packets at the PDCP sublayer was agreed.

However, it is noted that a duplication of packets at the PDCP sublayer can lead to possible inefficiencies in RLC operation in AM mode.

The example embodiments of the invention as described herein at least work to address operational inefficiencies that can be caused by this duplication of packets associated with PDCP.

SUMMARY

This section contains examples of possible implementations and is not meant to be limiting.

In one exemplary embodiment, a method comprises determining by a wireless device of a communication network that at least one packet data convergence protocol data unit of a packet data convergence protocol sublayer are duplicate packet data convergence protocol data units of the packet data convergence protocol sublayer having been submitted for transmission on two or more carriers; signaling to a control sublayer an indication of each packet data convergence protocol data unit that is a duplicate packet data convergence protocol data unit; and based on the indication, preventing a trigger of a radio link failure when a number of retransmissions based on the duplicate packet data convergence protocol data units reaches a threshold number of retransmissions.

A further exemplary embodiment is a method comprising the method of the previous paragraph, there is based on the indication, receiving instructions to discard other packet data convergence protocol duplicates over carriers other than the one of two or more carriers with a successful delivery. In another exemplary embodiment is a method as in the previous paragraph where based on the indication there is preventing a trigger of a radio link failure when a number of retransmissions based on the duplicate packet data convergence protocol data units reaches a threshold number of retransmissions. Further, a method comprising the method of the previous paragraph, wherein the control sublayer comprises one of a radio link control sublayer and a radio resource control sublayer, and wherein the indication is signaled per packet data convergence protocol data unit or per radio bearer. An additional exemplary embodiment is the method of this paragraph and/or the previous paragraph, wherein the indication indicates which packet data convergence protocol data units are duplicates. A further exemplary embodiment is the method of this paragraph and/or the previous paragraph, wherein the indication of the duplicate packet data convergence protocol data unit is received by the one of the radio link control sublayer and the radio resource control layer from the packet data convergence protocol sublayer via a Primitive between the radio link control sublayer and the packet data convergence protocol sublayer. In another exemplary embodiment is the method of this paragraph and/or the previous paragraph, wherein the one of the radio link control sublayer and the radio link control sublayer is configured by radio resource control to prevent the trigger of the radio link failure when the indication of duplication is received. Still another exemplary embodiment is the method of this paragraph and/or the previous paragraph, wherein the wireless device comprises a mobile device, and wherein the packet data convergence protocol sublayer and the radio link control sublayer are used for uplink transmissions by the mobile device. Yet another exemplary embodiment is the method of this paragraph and/or the previous paragraph, wherein the RLC sublayer is configured such that a radio link failure is never triggered when the packet data convergence protocol data units reaches a maximum number or threshold number of retransmissions.

In another exemplary embodiment, an apparatus comprises means for determining by a wireless device of a communication network that at least one packet data convergence protocol data unit of a packet data convergence protocol sublayer are duplicate packet data convergence protocol data units of the packet data convergence protocol sublayer having been submitted for transmission on two or more carriers; means for signaling to a control sublayer an indication of each packet data convergence protocol data unit that is a duplicate packet data convergence protocol data unit; and means, based on the indication, for preventing a trigger of a radio link failure when a number of retransmissions based on the duplicate packet data convergence protocol data units reaches a threshold number of retransmissions.

A further exemplary embodiment is an apparatus comprising the apparatus of the previous paragraph, there are means, based on the indication, for receiving instructions to discard other packet data convergence protocol duplicates over carriers other than the one of two or more carriers with a successful delivery. In an additional exemplary embodiment is the apparatus of this paragraph and/or the previous paragraph, there is based on the indication, for preventing a trigger of a radio link failure when a number of retransmissions based on the duplicate packet data convergence protocol data units reaches a threshold number of retransmissions. Further, wherein the indication is signaled per packet data convergence protocol data unit or per radio bearer. An additional exemplary embodiment is the apparatus of this paragraph and/or the previous paragraph, wherein the indication indicates which packet data convergence protocol data units are duplicates. A further exemplary embodiment is the apparatus of this paragraph and/or the previous paragraph, wherein the indication of the duplicate packet data convergence protocol data units is received by the radio link control sublayer from the packet data convergence protocol sublayer via a Primitive between the radio link control sublayer and the packet data convergence protocol sublayer. In another exemplary embodiment is the apparatus of this paragraph and/or the previous paragraph, wherein the radio link control sublayer is configured by radio resource control to prevent the trigger of the radio link failure when the indication of duplication is received. Still another exemplary embodiment is the apparatus of this paragraph and/or the previous paragraph, wherein the wireless device comprises a mobile device, and wherein the packet data convergence protocol sublayer and the radio link control sublayer are used for uplink transmissions by the mobile device. Yet another exemplary embodiment is the apparatus of this paragraph and/or the previous paragraph, wherein the radio link control sublayer is configured such that a radio link failure is never triggered when the packet data convergence protocol data units reaches a maximum number or threshold number of retransmissions.

In a further exemplary embodiment, an apparatus comprises one or more processors and one or more memories including computer program code. The one or more memories and the computer program code configured, with the one or more processors, to cause the apparatus to perform at least the following: determining by a wireless device of a communication network that at least one packet data convergence protocol data unit of a packet data convergence protocol sublayer are duplicate packet data convergence protocol data units of the packet data convergence protocol sublayer having been submitted for transmission on two or more carriers; signaling to a control sublayer an indication of each packet data convergence protocol data unit that is a duplicate packet data convergence protocol data unit; and based on the indication, receiving instructions to discard other packet data convergence protocol duplicates over carriers other than the one of two or more carriers with a successful delivery.

An additional exemplary embodiment is an apparatus comprising the apparatus of the previous paragraph, there is, based on the indication, for receiving instructions to discard other packet data convergence protocol duplicates over carriers other than the one of two or more carriers with a successful delivery. In an additional exemplary embodiment is the apparatus of this paragraph and/or the previous paragraph, there is based on the indication, preventing a trigger of a radio link failure when a number of retransmissions based on the duplicate packet data convergence protocol data units reaches a threshold number of retransmissions. Further, there is wherein the control sublayer comprises one of a radio link control sublayer and a radio resource control sublayer, and wherein the indication is signaled per packet data convergence protocol data unit or per radio bearer. An additional exemplary embodiment is the apparatus of this paragraph and/or the previous paragraph, wherein the indication indicates which packet data convergence protocol data units are duplicates. A further exemplary embodiment is the apparatus of this paragraph and/or the previous paragraph, wherein the indication of the duplicate packet data convergence protocol data units is received by the radio link control sublayer from the packet data convergence protocol sublayer via a Primitive between the radio link control sublayer and the packet data convergence protocol sublayer. In another exemplary embodiment is the apparatus of this paragraph and/or the previous paragraph, wherein the radio link control sublayer is configured by radio resource control to prevent the trigger of the radio link failure when the indication of duplication is received. Still another exemplary embodiment is the apparatus of this paragraph and/or the previous paragraph, wherein the wireless device comprises a mobile device, and wherein the packet data convergence protocol sublayer and the radio link control sublayer are used for uplink transmissions by the mobile device. Yet another exemplary embodiment is the apparatus of this paragraph and/or the previous paragraph, wherein the RLC sublayer is configured such that a radio link failure is never triggered when the packet data convergence protocol data units reaches a maximum number or threshold number of retransmissions.

In another exemplary embodiment, a method comprises transmitting, by a wireless node, packet data convergence protocol data unit duplicates over two or more carriers; receiving an indication that indicates packet data convergence protocol data unit has been correctly transmitted via one of two or more carriers; and upon receiving the indication, instructing to discard other packet data convergence protocol duplicates over carriers other than the one of two or more carriers with a successful delivery.

A further exemplary embodiment is a method comprising the method of the previous paragraph, wherein discarding the other packet data convergence protocol duplicates comprises informing a corresponding radio link control entity not to transmit the packet data convergence protocol duplicates. An additional exemplary embodiment is the method of this paragraph and/or the previous paragraph, wherein the wireless node comprises one of a user equipment, a master based station and a secondary base station. In another exemplary embodiment is the method of this paragraph and/or the previous paragraph, wherein the wireless node comprises a master base station, and wherein the indication is received by a radio link control function from a packet data convergence packet unit sublayer of the master base station via a Primitive between the packet data convergence packet unit sublayer and the radio link control function. An another exemplary embodiment is the method of this paragraph and/or the previous paragraph, wherein the wireless node comprises a secondary base station, and wherein the indication is received by a radio link control function of the secondary base station over X2 signaling between a packet data convergence packet unit sublayer of a master base station and a packet data convergence packet unit sublayer of the secondary base station. In still another exemplary embodiment is the method of this paragraph and/or the previous paragraph, wherein the wireless node comprises a mobile device, and wherein the at least one of a packet data convergence packet unit and a service data unit is used for uplink transmissions by the mobile device.

In another exemplary embodiment, an apparatus comprises means for transmitting, by a wireless node, packet data convergence protocol data unit duplicates over two or more carriers; means for receiving an indication that indicates packet data convergence protocol data unit has been correctly transmitted via one of two or more carriers; and means, upon receiving the indication, for instructing to discard other packet data convergence protocol duplicates over carriers other than the one of two or more carriers with a successful delivery.

A further exemplary embodiment is an apparatus comprising the apparatus of the previous paragraph, wherein discarding the other packet data convergence protocol duplicates comprises informing a corresponding radio link control entity not to transmit the packet data convergence protocol duplicates. An additional exemplary embodiment is the apparatus of this paragraph and/or the previous paragraph, wherein the wireless node comprises one of a user equipment, a master based station and a secondary base station. In another exemplary embodiment is the apparatus of this paragraph and/or the previous paragraph, wherein the wireless node comprises a master base station, and wherein the indication is received by a radio link control function from a packet data convergence packet unit sublayer of the master base station via a Primitive between the packet data convergence packet unit sublayer and the radio link control function. An another exemplary embodiment is the apparatus of this paragraph and/or the previous paragraph, wherein the wireless node comprises a secondary base station, and wherein the indication is received by a radio link control function of the secondary base station over X2 signaling between a packet data convergence packet unit sublayer of a master base station and a packet data convergence packet unit sublayer of the secondary base station. In still another exemplary embodiment is the apparatus of this paragraph and/or the previous paragraph, wherein the wireless node comprises a mobile device, and wherein the at least one of a packet data convergence packet unit and a service data unit is used for uplink transmissions by the mobile device.

In a further exemplary embodiment, an apparatus comprises one or more processors and one or more memories including computer program code. The one or more memories and the computer program code configured, with the one or more processors, to cause the apparatus to perform at least the following: transmitting, by a wireless node, packet data convergence protocol data unit duplicates over two or more carriers; receiving an indication that indicates packet data convergence protocol data unit has been correctly transmitted via one of two or more carriers; and upon receiving the indication, instructing to discard other packet data convergence protocol duplicates over carriers other than the one of two or more carriers with a successful delivery.

An additional exemplary embodiment is an apparatus comprising the apparatus of the previous paragraph, wherein discarding the other packet data convergence protocol duplicates comprises informing a corresponding radio link control entity not to transmit the packet data convergence protocol duplicates. An additional exemplary embodiment is the apparatus of this paragraph and/or the previous paragraph, wherein the wireless node comprises one of a user equipment, a master based station and a secondary base station. In another exemplary embodiment is the apparatus of this paragraph and/or the previous paragraph, wherein the wireless node comprises a master base station, and wherein the indication is received by a radio link control function from a packet data convergence packet unit sublayer of the master base station via a Primitive between the packet data convergence packet unit sublayer and the radio link control function. An another exemplary embodiment is the apparatus of this paragraph and/or the previous paragraph, wherein the wireless node comprises a secondary base station, and wherein the indication is received by a radio link control function of the secondary base station over X2 signaling between a packet data convergence packet unit sublayer of a master base station and a packet data convergence packet unit sublayer of the secondary base station. In still another exemplary embodiment is the apparatus of this paragraph and/or the previous paragraph, wherein the wireless node comprises a mobile device, and wherein the at least one of a packet data convergence packet unit and a service data unit is used for uplink transmissions by the mobile device.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose novel operations that will improve radio link control and radio link failure operations when duplication at a PDCP sublayer takes place.

Figure 1:
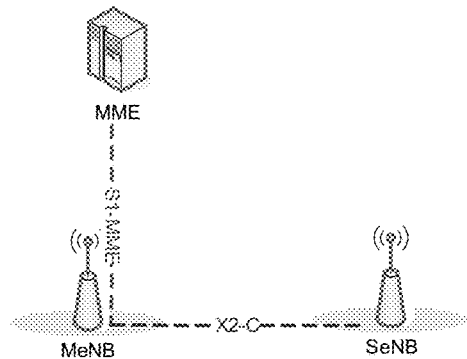
FIG. 1 shows C-Plane connectivity of eNBs involved in Dual Connectivity as in FIG. 4.9.3.1-1 of 3GPP TS 36.300 V14.1.0 (2016-12)
Figure 4:
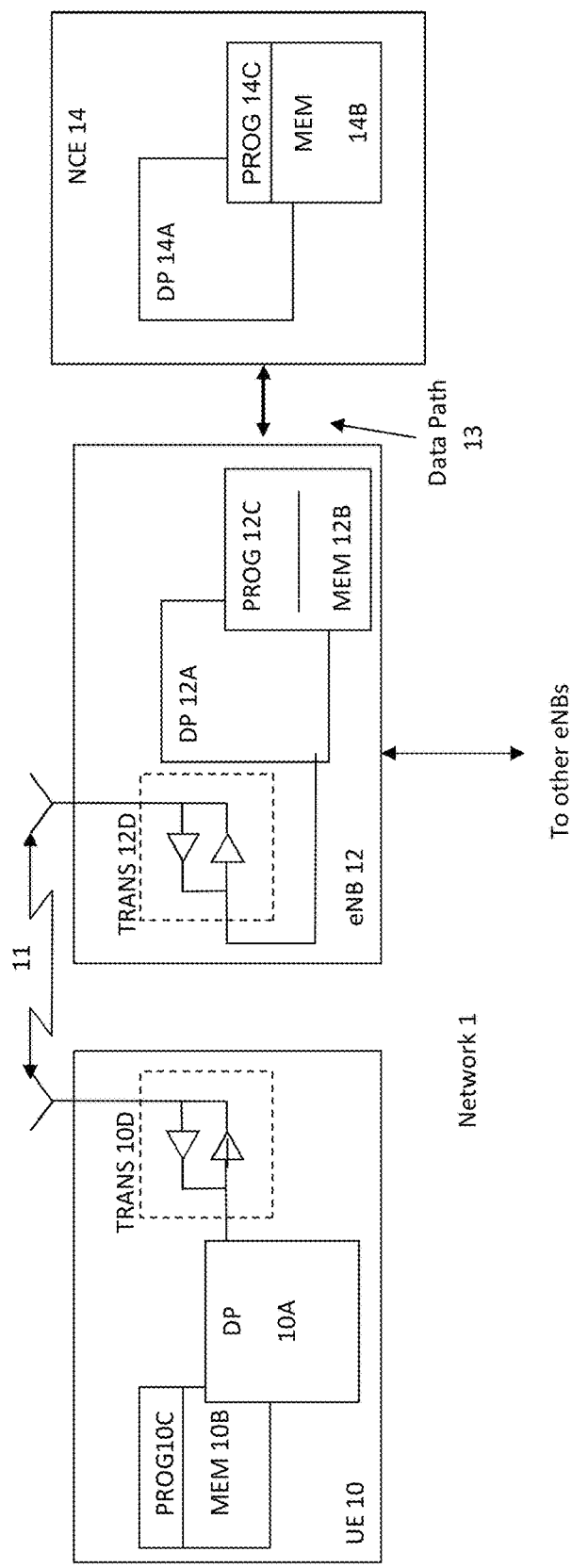
FIG. 4 shows a simplified block diagram of various electronic devices that are suitable for use in practicing the exemplary embodiments of this invention.

FIG. 1 shows FIG. 4.9.3.1-1 of 3GPP TS 36.300 V14.1.0 (2016-12) which shows a C-plane connectivity of eNBs involved in DC for a certain UE. As shown in FIG. 1 there is an S1-MME interface terminated at the MeNB and the MeNB and the SeNB are interconnected via X2-C. The S1 interface supports a many-to-many relationship between MME/S-GW and eNBs.

For a "split bearer" the Master eNB (MeNB) can be U-plane connected to the MME/S-GW via S1-U and in addition, the MeNB is interconnected to a Secondary eNB (SeNB) via X2-U. The routing function in the PDCP layer of the MeNB decides whether a PDCP layer PDU of a split bearer is sent directly over the local air interface to the UE or whether it is forwarded to the SeNB via X2-U.

Figure 2:
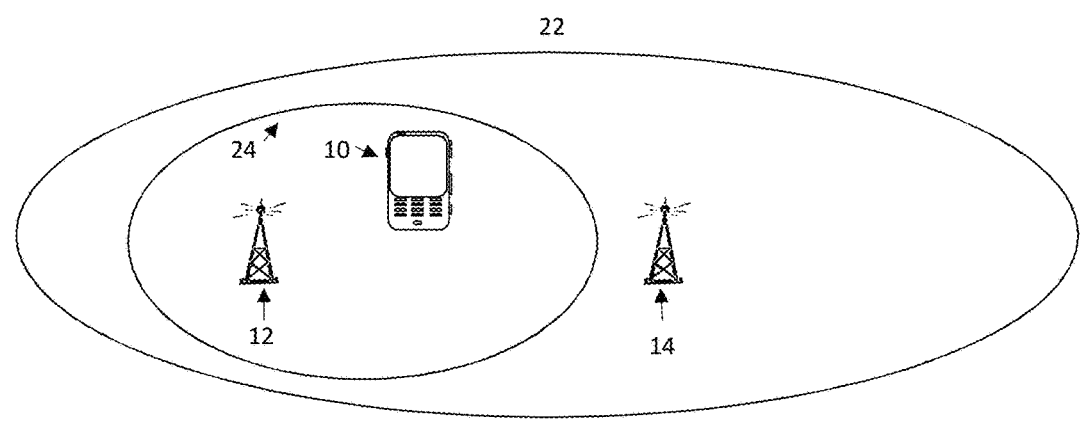
FIG. 2 shows a diagram illustrating an example of a User Equipment (UE) in partially overlapping cells.

Referring also to FIG. 2, a user equipment (UE 10) may be connected to more than one cell at a same time. In this example the UE 10 is connected to a first cell 22 having a base station 12 (such as an eNB or NCE or WLAN access point for example) and a second cell 24 having a base station 14 (eNB or NCE or WLAN access point for example). The two cells 22, 24 are, thus, at least partially overlapping. In one type of example embodiment, the first cell may operate on a licensed band and the second one may operate on an unlicensed band. For simplicity, there are just two cells depicted in the scenario shown in FIG. 2. In other alternate examples any number of cells operating on licensed and/or unlicensed band(s) may be provided to work together for a suitable Carrier Aggregation (CA) or Dual Connectivity.

Further, in accordance with the example embodiments the base station 12 and/or base station 14 may comprise a Master eNB or Secondary eNB. For the transport of user plane data from the S-GW to the UE so-called "split bearers" may be used. Split bearers provide two or more paths for downlink user plane data. They can either be sent from the S-GW via the "Master eNB (MeNB)" to the UE, or they can be sent from the S-GW via the MeNB to the Secondary eNB (SeNB) which finally sends them to the UE.

In accordance with the example embodiments of the invention, a UE and/or base stations and/or other network devices using such split bearers can be configured to include PDCP layer functionalities to perform at least the RLF trigger and/or packet discarding functionality as described herein.

Figure 3A:
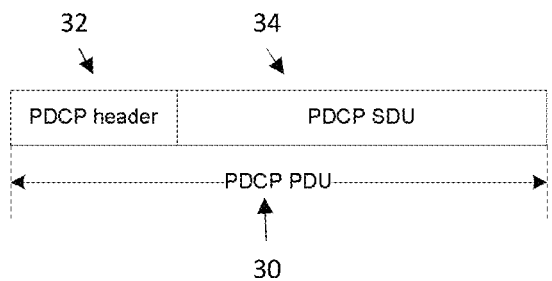
FIG. 3a shows a PDCP PDU Structure.

Further, reference is made to FIG. 3a which shows a PDCP PDU structure. As shown in FIG. 3a there is PDCP PDU 30 which includes a PDCP header 32 and a PDCP SDU payload 34.

In addition, below the PDCP header and payload lies an RLC sublayer. As similarly stated above, the main services or functions of the PDCP sublayers, for example, include: header compression and decompression, transfer of user data and ciphering & deciphering as well as timer-based SDU discard. When dual connectivity is configured for split bearer, PDCP also performs reordering in a continuous manner. Further, the PDCP can also be used packet discarding functionality as described herein. These functions can also rely on information, such as a PDCP SN, in the PDCP header of each PDCP PDU.

The example embodiments of the invention address operations performed in PDCP sublayers. The RLC sublayer for example whose main services and functions include:
Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer).
These functions can also rely on an RLC SN in the RLC header of every RLC PDUs.

Figure 3B:
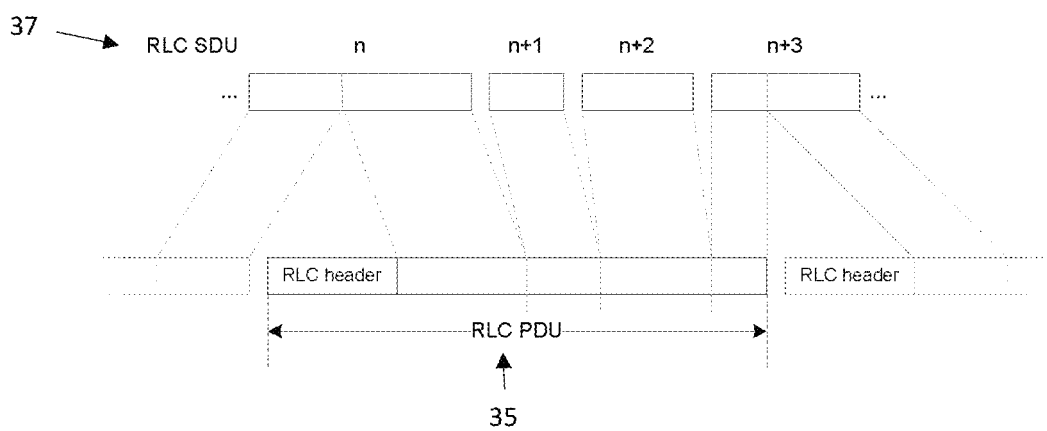
FIG. 3b shows a RLC PDU Structure.

FIG. 3b shows a RLC PDU 35. The RLC structure is a sub layer of the PDCP. As shown in FIG. 3b the RLC PDU 35 includes a RLC SDU 37 As shown in FIG. 3b the RLC SDU 37 includes an indication of duplicates of packets e.g., as n, n+1, n+2, and n+3.

Further, it is noted that below the RLC structure lies the MAC sublayer whose main services and functions include:
Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
Transport format selection; and
Padding.
Relevant specification excerpts from the standards regarding the points above include:
3GPP TS 36.322 V13.2.0 (2016-06) section 5.2.1:
When an AMD PDU or a portion of an AMD PDU is considered for retransmission, the transmitting side of the AM RLC entity shall:
if the AMD PDU is considered for retransmission for the first time:
set the RETX_COUNT associated with the AMD PDU to zero;
else, if it (the AMD PDU or the portion of the AMD PDU that is considered for retransmission) is not pending for retransmission already, or a portion of it is not pending for retransmission already:
increment the RETX_COUNT;
if RETX_COUNT=maxRetxThreshold:
indicate to upper layers that max retransmission has been reached.
3GPP TS 36.331 V14.1.0 (2016-12)
5.3.10.3 DRB Addition/Modification
The UE shall:
1> for each drb-Identity value included in the drb-ToAddModList that is not part of the current UE configuration (DRB establishment including the case when full configuration option is used):
2> if the concerned entry of drb-ToAddModList includes the drb-TypeLWA set to TRUE (i.e. add LWA DRB):
3> perform the LWA specific DRB addition or reconfiguration as specified in 5.3.10.3a2;
2> if the concerned entry of drb-ToAddModList includes the drb-TypeLWIP (i.e. add LWIP DRB):
3> perform LWIP specific DRB addition or reconfiguration as specified in 5.3.10.3a3;
2> else if drb-ToAddModListSCG is not received or does not include the drb-Identity value (i.e. add MCG DRB):
3> establish a PDCP entity and configure it with the current MCG security configuration and in accordance with the received pdcp-Config;

5.3.11 Radio link failure related actions
5.3.11.1 Detection of physical layer problems in RRC_CONNECTED
The UE shall:
1> upon receiving N310 consecutive "out-of-sync" indications for the PCell from lower layers while neither T300, T301, T304 nor T311 is running:
2> start timer T310;
1> upon receiving N313 consecutive "out-of-sync" indications for the PSCell from lower layers while T307 is not running:
2> start T313;
NOTE: Physical layer monitoring and related autonomous actions do not apply to SCells except for the PSCell.
5.3.11.3 Detection of radio link failure
The UE shall:
1> upon T310 expiry; or
1> upon T312 expiry; or
1> upon random access problem indication from MCG MAC while neither T300, T301, T304 nor T311 is running; or
1> upon indication from MCG RLC that the maximum number of retransmissions has been reached for an SRB or for an MCG or split DRB:
2> consider radio link failure to be detected for the MCG i.e. RLF.
5.3.12 UE actions upon leaving RRC_CONNECTED
Upon leaving RRC_CONNECTED, the UE shall:
1> reset MAC;
1> stop all timers that are running except T320, T325 and T330;
1> if leaving RRC_CONNECTED was triggered by suspension of the RRC:
2> re-establish RLC entities for all SRBs and DRBs;
2> store the UE AS Context including the current RRC configuration, the current security context, the PDCP state including ROHC state, C-RNTI used in the source PCell, the cellIdentity and the physical cell identity of the source PCell;
2> store the following information provided by E-UTRAN:
3> the resumeIdentity;
2> suspend all SRB(s) and DRB(s), except SRB0;
2> indicate the suspension of the RRC connection to upper layers;
2> configure lower layers to suspend integrity protection and ciphering;
5.6.13 SCG Failure Information
The purpose of this procedure is to inform E-UTRAN about an SCG failure the UE has experienced i.e. SCG radio link failure, SCG change failure.
5.6.13.2 Initiation
A UE initiates the procedure to report SCG failures when SCG transmission is not suspended and when one of the following conditions is met:
1> upon detecting radio link failure for the SCG, in accordance with 5.3.11; or
1> upon SCG change failure, in accordance with 5.3.5.7a; or
1> upon stopping uplink transmission towards the PSCell due to exceeding the maximum uplink transmission timing difference when powerControlMode is configured to 1, in accordance with subclause 7.17.2 of TS 36.133 [29].

Upon initiating the procedure, the UE shall:
1> suspend all SCG DRBs and suspend SCG transmission for split DRBs;
1> reset SCG-MAC;
1> stop T307;
1> initiate transmission of the SCGFailureInformation message in accordance with 5.6.13.3;
With regards to an RLF, current operations of the present standards can be summarized as:
Leaving an RRC Connected mode;
resetting MAC;
re-establishing RLC entities for all SRBs and DRBs;
releasing all radio resources, including release of the RLC entity, the MAC configuration and the associated PDCP entity for all established RBs; and
indicating the release of the RRC connection to upper layers together with the release cause.

In addition, as similarly stated above a study item on NR Access Technology has been agreed that to increase reliability as well as potentially decrease latency, packet duplication of packets at the PDCP sublayer. NR operations can use high bit rates, such as for 5G operations, and in NR a system bandwidth can be aggregated over more than one carrier. However, although handling of duplicates within one layer or over one carrier is known and specified in 3GPP, it is submitted that handling of duplicates across layers of a communication over two or more aggregated carriers, such as in NR, is not known. The Example embodiments of the invention work to address at least these shortfalls of the present standards specifications.

Herein, there is seen to be a problem as a duplication of packets at the PDCP sublayer over the more than one carrier can lead to possible inefficiencies in RLC operation in AM mode, particularly when such duplication takes place. These inefficiencies relate to radio link control and radio link failure operations when duplication at the PDCP sublayer takes place.

The example embodiments of the invention relate to novel operations to improve radio link control and radio link failure operations when duplication at the PDCP sublayer takes place.

Before describing in further detail the exemplary embodiments of this invention, reference is made to FIG. 4 for illustrating a simplified block diagram of various electronic devices and apparatus that are suitable for use in practicing the exemplary embodiments of this invention.

In FIG. 4 a wireless network 1 is adapted for communication over a wireless link 11 with an apparatus, such as a mobile communication device which may be referred to as a UE 10, via a network access node, such as a Node B (base station), and more specifically an eNB 12.

The Network 1 may include a network control element (NCE) 14 that may include the MME/SGW functionality, and which provides connectivity with a further network, such as a telephone network and/or a data communications network (e.g., the internet).

The NCE 14 includes a controller, such as a computer or a data processor (DP) 14A, a computer-readable memory medium embodied as a memory (MEM) 14B that stores a program of computer instructions (PROG) 14C, and a suitable path for communication with the eNB 12 via a data/control path 13 to the eNB 12, which may be implemented as the X2 interface for example.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas.

The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The eNB 12 may also be coupled to the NCE 14 via data/control path 15, which may be implemented by a wired or wireless interface for example an X2 interface. In addition, the eNB 12 may include the MME/SGW functionality, and which provides connectivity with a further network, such as a telephone network and/or a data communications network (e.g., the internet). Further, in accordance with the example embodiments the eNB 12 and/or NCE 14 may comprise a Master eNB or Secondary eNB.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

At least one of the PROGs 10C, 12C, and 14C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12 and/or by the DP 14A of the NCE 14, or by hardware, or by a combination of software and hardware (and firmware).

The computer readable MEMs 10B, 12B, and 14B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A, and 14A may be of any type suitable to the local technical environment, and may include one or more of general purpose computers, special purpose computers, microprocessors, digital signal processors (DSPs) and processors based on multi-core processor architectures, as non-limiting examples.

The example embodiments of the invention, address problems that can be caused by packet duplication at PDCP sublayer for multi-connectivity where the same PDCP PDU are sent via two or more different RLC entities using a different transmission path and/or different logical channels.

The example embodiments of the invention can be applied to an advantage in communication operations using carrier aggregation or multi-connectivity situations where inefficiencies exist such as:
1) In RLC AM operation, Failure to transmit a duplicate PDU triggers unnecessary radio link failure; and
2) When PDCP is informed of the reception of a duplicate via one leg, transmitting the duplicate via the other leg becomes a waste of resources.

In order to resolve the identified inefficiencies, the example embodiments of the invention provide novel operations that include informing RLC of a device, for discarding and/or ignoring, which RLC SDUs communicated over more than one carrier to a destination device can be considered as duplicates, and operations for causing an RLF to not be allowed even when an RLF is seen to be detected based on an apparent retransmission for a PDCP duplicate communicated over more than one carrier to a destination device reaching a maximum number or a threshold of retransmission for the PDCP duplicate.

Duplicate Packet Operations

The example embodiments of the invention provide PDCP operations to inform RLC of a device which RLC SDUs submitted for communication can be considered as duplicates.

In accordance with the example embodiments the instructions related to not allowing an RLF and/or not transmitting other duplicate packets can be performed using PDCP discard instructions to inform a corresponding RLC entity not allow an RLF and/or not transmit the duplicate packet(s).

Further, in accordance with the example embodiments an indication of a correct transmission via any of the legs, can trigger PDCP to signal a PDCP PDU discard to all the other legs. In accordance with the embodiments an RLC can be instructed and allowed to discard the PDCP PDU even if it has started the transmission of the PDU (transmission of a segment).

In accordance with the embodiments when a discard timer expires for a PDCP SDU, or a successful delivery of a PDCP SDU is confirmed by PDCP status report, the UE shall discard the PDCP SDU along with the corresponding PDCP PDU. If the corresponding PDCP PDU has already been submitted to lower layers the discard is indicated to lower layers.

In addition, when the successful delivery of a duplicated PDCP SDU is confirmed by lower layers, the UE shall discard the PDCP SDU along with the corresponding PDUs in all legs for which the indication of successful delivery is still pending. If for a given leg, the corresponding PDCP PDU has already been submitted to lower layers, the discard is indicated to lower layers of that leg.

RLF Operations

The example embodiments of the invention provide novel operations that include causing an RLF to not be allowed even when an RLF is seen to be detected such as based on an apparent retransmission for a PDCP duplicate reaching a maximum number or a threshold number of retransmission for the PDCP duplicate. In accordance with example embodiments of the invention this maximum number or threshold number may be predetermined by a network device such as a UE or provided to the device by the network.

Further, in accordance with example embodiments of the invention an RLF may not be allowed even when an RLF is seen to be detected, such as based on an apparent retransmission for a PDCP duplicate. In accordance with an example embodiment the retransmissions may be performed by for example an RLC sublayer, and the RLF can be not allowed even when an RLF is indicated based on the retransmissions for the PDCP duplicates.

In accordance with an example embodiment of the invention, PDCP operations associated with an RLC cause the RLC to be configured in such a way that when duplication at the PDCP takes place then an RLF is not allowed to be triggered upon reaching a maximum number or a threshold number of retransmissions.

In accordance with another example embodiment, RLF for a bearer (whole bearer) that is assumed to use duplication is caused to be not triggered.

PDCP operations associated with an RLC, in which RLC SDUs can be considered as duplicates, cause PDCP signalling to the RLC to indicate which SDUs are duplicates. These exemplary operations could be limited to the PDCP duplicate for which another version has been successfully transmitted.

In accordance with an example embodiment of the invention, PDCP maintains transmission buffers and relies on indication from RLC to manage them, and uses the indication from RLC from one of the legs to identify a PDCP discard and signal it to another leg.

In another example embodiment of the invention, based on an indication from any of the leg that a PDCP PDU has been correctly transmitted, there is instructing the other legs not to transmit the other duplicates.

In accordance with the embodiments this signaling can be primitive, per packet or per bearer, and between layers (i.e. RLC and PDCP). In accordance with the example embodiments, the signaling causes the RLC to be configured, such as by RRC, to apply the operations in accordance with the example embodiments of the invention. In accordance with an example embodiment of the invention the PDU structure does not need to be modified.

Figure 5A:
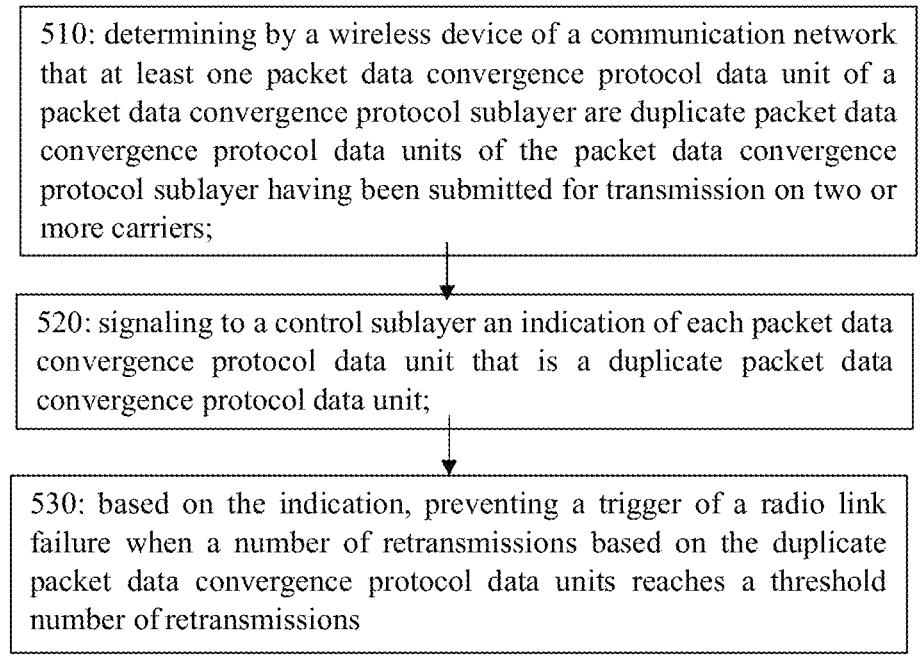
FIGS. 5a and 5b each show a method that can be performed by an apparatus in accordance with the example embodiments of the invention.

In regards to FIG. 5a there is illustrated a method and the operation of a computer program product in accordance with an exemplary embodiments of the invention which may be performed by a network device e.g., a wireless device, such as the UE 10, the eNB 12, and/or the NCE 14 as illustrated in FIG. 4. As shown in step 510 of FIG. 3a there is determining by a wireless device of a communication network that at least one packet data convergence protocol data unit of a packet data convergence protocol sublayer are duplicate packet data convergence protocol data units of the packet data convergence protocol sublayer having been submitted for transmission on two or more carriers. As shown in step 520 of FIG. 5a there is signaling to a control sublayer an indication of each packet data convergence protocol data unit that is a duplicate packet data convergence protocol data units. Then as shown in step 530 there is based on the indication, preventing a trigger of a radio link failure when a number of retransmissions based on the duplicate packet data convergence protocol data units reaches a threshold number of retransmissions.

In accordance with the example embodiments as described in the paragraph above there is, based on the indication based on the indication, receiving instructions to discard other packet data convergence protocol duplicates over carriers other than the one of two or more carriers with a successful delivery.

In accordance with the example embodiments as described in the paragraph above, wherein the control sublayer comprises one of a radio link control sublayer and a radio resource control sublayer, and wherein the indication is signaled per packet data convergence protocol data unit or per radio bearer, and wherein the indication indicates which packet data convergence protocol data units are duplicates.

In accordance with the example embodiments as described in the paragraphs above, there is preventing a trigger of a radio link failure when a number of retransmissions based on the duplicate packet data convergence protocol data units reaches a maximum number or a threshold number of retransmissions.

In accordance with the example embodiments as described in the paragraphs above, the indication is signaled per packet data convergence protocol data unit or per radio bearer.

In accordance with the example embodiments as described in the paragraphs above, the indication indicates which packet data convergence protocol data units are duplicates.

In accordance with the example embodiments as described in the paragraphs above, the indications of the duplicate packet data convergence protocol data units is received by the control sublayer from the packet data convergence protocol sublayer via a Primitive between the control sublayer and the packet data convergence protocol sublayer.

In accordance with the example embodiments as described in the paragraphs above, the control sublayer is configured by radio resource control to prevent the trigger of the radio link failure when the indication of duplication is received.

In accordance with the example embodiments as described in the paragraphs above, the wireless device comprises a mobile device, and wherein the packet data convergence protocol sublayer and the radio link control sublayer are used for uplink transmissions by the mobile device.

In accordance with the example embodiments as described in the paragraphs above, the control sublayer configured such that a radio link failure is never triggered when the packet data convergence protocol data units reaches a maximum number or a threshold number of retransmissions.

A non-transitory computer-readable medium storing program code, the program code executed by at least one processor to perform the method as described in any of the paragraphs above.

In accordance with an example embodiment of the invention as described above there is an apparatus comprising: means for determining (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) by a wireless device (UE 10, eNB 12, and/or NCE 14 as in FIG. 4) of a communication network that at least one packet data convergence protocol data unit of a packet data convergence protocol sublayer are duplicate packet data convergence protocol data units of the packet data convergence protocol sublayer having been submitted for transmission; means for signaling (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) to a control sublayer an indication of each packet data convergence protocol data unit that is a duplicate packet data convergence protocol data unit; and means, based on the indications, for preventing (DP 10A, DP 12A, and/or DP 14A, PROG 10C, PROG 12C and/or PROG 14C, and MEM 10B, MEM 12B and/or 14B as in FIG. 4) a trigger of a radio link failure when a number of retransmissions based on the duplicate packet data convergence protocol data units reaches a threshold number of retransmissions.

Figure 5B:
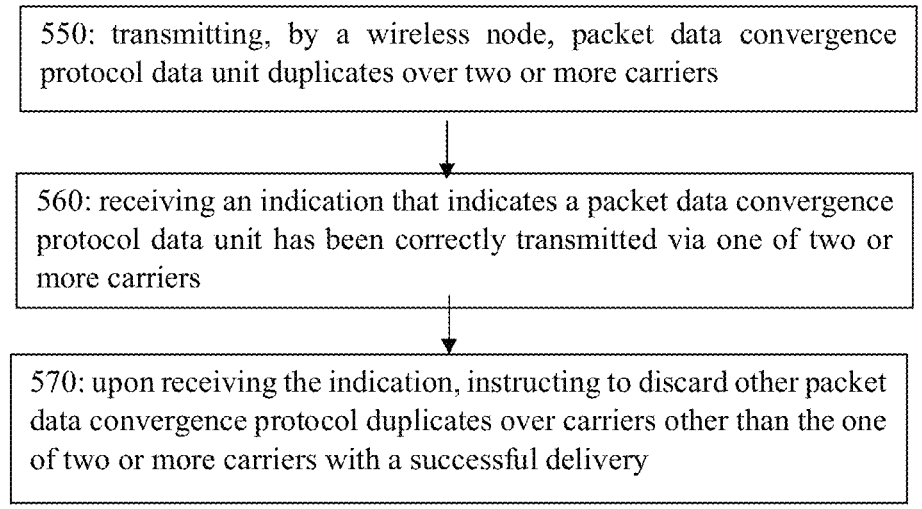

FIG. 5b illustrates further or separate operations which may be performed by a device such as, but not limited to, a device, such as the UE 10, the eNB 12, and/or the NCE 14 as illustrated in FIG. 4. As shown in step 550 of FIG. 5b there transmitting, by a wireless node, packet data convergence protocol data unit duplicates over two or more carriers. As shown in step 560 of FIG. 5b there is receiving an indication that indicates a packet data convergence protocol data unit has been correctly transmitted via one of two or more carriers. Then as shown in step 570 there is upon receiving the indication, instructing to discard other packet data convergence protocol duplicates over carriers other than the one of two or more carriers with a successful delivery.

In accordance with the example embodiments as described in the paragraph above, discarding the other packet data convergence protocol duplicates comprises informing a corresponding radio link control entity not to transmit the packet data convergence protocol duplicates.

In accordance with the example embodiments as described in the paragraphs above, the wireless node comprises one of a user equipment, a master based station and a secondary base station.

In accordance with the example embodiments as described in the paragraphs above, the wireless node comprises a master base station, and wherein the indication is received by a radio link control function from a packet data convergence packet unit sublayer of the master base station via a Primitive between the packet data convergence packet unit sublayer and the radio link control function.

In accordance with the example embodiments as described in the paragraphs above, the wireless node comprises a secondary base station, and wherein the indication is received by a radio link control function of the secondary base station over X2 signaling between a packet data convergence packet unit sublayer of a master base station and a packet data convergence packet unit sublayer of the secondary base station.

In accordance with the example embodiments as described in the paragraphs above, the wireless node comprises a mobile device, and wherein the at least one of a packet data convergence packet unit and a service data unit is used for uplink transmissions by the mobile device.

A non-transitory computer-readable medium storing program code, the program code executed by at least one processor to perform the method as described in any of the paragraphs above.

In accordance with an example embodiment of the invention as described above there is an apparatus comprising: means for transmitting (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4), by a wireless node, packet data convergence protocol data unit duplicates over two or more carriers (i.e. transmit packet data convergence protocol duplicates via multiple legs); means for receiving (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) an indication that indicates a packet data convergence protocol data unit has been correctly transmitted via one of two or more carriers (i.e. receive indication from any of the legs that a packet data convergence protocol data unit has been correctly transmitted); and means, upon receiving the indication, for instructing (wireless link 11 and/or Data Path 13, DP 10A, DP 12A, and/or DP 14A, PROG 10C, PROG 12C and/or PROG 14C, and MEM 10B, MEM 12B and/or 14B as in FIG. 4) to discard other packet data convergence protocol duplicates over carriers other than the one of two or more carriers with a successful delivery (instruct the other legs not to transmit the other duplicates).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A mobile device comprising:
   at least one processor; and
   at least one memory storing instructions thereon that, when executed by the at least one processor, cause the mobile device to perform at least:
   instructing to transmit, over two or more carriers, a packet data convergence protocol (PDCP) protocol data unit (PDU) and a PDCP PDU duplicate, wherein the PDCP PDU and the PDCP PDU duplicate are used for uplink transmissions by the mobile device;

receiving an indication, from a radio link control (RLC) entity, that one of the PDCP PDU or the PDCP PDU duplicate has been successfully delivered via one of the two or more carriers as confirmed by the RLC entity; and in response to receiving the indication, instructing to discard the other one of the PDCP PDU or the PDCP PDU duplicate over at least one carrier other than the one of two or more carriers with successful delivery as confirmed by the RLC entity.

2. The mobile device of claim 1, wherein the instructing to discard the other of the PDCP PDU or the PDCP PDU duplicate comprises informing a corresponding RLC entity not to transmit the other of the PDCP PDU or the PDCP PDU duplicate.

3. The mobile device of claim 1, wherein the instructions stored on the at least one memory, when executed by the at least one processor, further cause the mobile device to perform:

detecting a radio link failure at a bearer for retransmission of a PDCP PDU duplicate; and based on duplication of the PDCP PDU taking place, causing the radio link failure to not be allowed to be triggered upon a number of PDCP PDU retransmissions reaching a maximum number of PDCP PDU retransmissions or a threshold number of PDCP PDU retransmissions that is predetermined or is provided by a communication network.

4. The mobile device of claim 1, wherein the indication is signaled per PDCP PDU or per radio bearer.

5. The mobile device of claim 1, wherein the indication indicates which PDCP PDU is a duplicate.

6. A method comprising:

instructing, by a mobile device, to transmit a packet data convergence protocol (PDCP) protocol data unit (PDU) and a PDCP PDU duplicate for uplink transmissions over two or more carriers;

receiving an indication, from a radio link control (RLC) entity, that one of the PDCP PDU or the PDCP PDU duplicate has been successfully delivered via one of the two or more carriers as confirmed by the RLC entity; and in response to receiving the indication, instructing to discard the other one of the PDCP PDU or the PDCP PDU duplicate over at least one carrier other than the one of two or more carriers with successful delivery as confirmed by the RLC entity.

7. The method of claim 6, wherein instructing to discard the other one of the PDCP PDU or the PDCP PDU duplicate comprises informing a corresponding RLC entity not to transmit the other one of the PDCP PDU or the PDCP PDU duplicate.

8. The method of claim 6, wherein the indication is signaled per PDCP PDU or per radio bearer.

9. The method of claim 6, wherein the indication indicates which PDCP PDU is a duplicate.

10. The method of claim 6, further comprising:

detecting a radio link failure at a bearer for retransmission of a PDCP PDU duplicate; and based on duplication of the PDCP PDU taking place, causing the radio link failure to not be allowed to be triggered upon a number of PDCP PDU retransmissions reaching a maximum number of PDCP PDU retransmissions or a threshold number of PDCP PDU retransmissions that is predetermined or is provided by a communication network.

11. A non-transitory computer-readable storage medium comprising instructions thereon that, when executed by at least one processor, cause a mobile device to perform at least:

instructing to transmit, over two or more carriers, a packet data convergence protocol (PDCP) protocol data unit (PDU) and a PDCP PDU duplicate;

receiving an indication, from a radio link control (RLC) entity, that one of the PDCP PDU or the PDCP PDU duplicate has been successfully delivered via one of the two or more carriers as confirmed by the RLC entity; and in response to receiving the indication, instructing to discard the other one of the PDCP PDU or the PDCP PDU duplicate over at least one carrier other than the one of two or more carriers with successful delivery as confirmed by the RLC entity.

12. The non-transitory computer-readable storage medium of claim 11, wherein the instructing to discard the other one of the PDCP PDU or the PDCP PDU duplicate comprises informing a corresponding RLC entity not to transmit the other one of the PDCP PDU or the PDCP PDU duplicate.

13. The non-transitory computer-readable storage medium of claim 11, wherein the indication is received per PDCP PDU or per radio bearer.

14. The non-transitory computer-readable storage medium of claim 11, wherein the instructions stored thereon, when executed by the at least one processor, further cause the mobile device to perform:

detecting a radio link failure at a bearer for retransmission of a PDCP PDU duplicate; and based on duplication of the PDCP PDU taking place, causing the radio link failure to not be allowed to be triggered upon a number of PDCP PDU retransmissions reaching a maximum number of PDCP PDU retransmissions or a threshold number of PDCP PDU retransmissions that is predetermined or is provided by a communication network.

15. The non-transitory computer-readable storage medium of claim 11, wherein the indication indicates which PDCP PDU is the duplicate.

* * * * *